United States Patent [19]

Daly et al.

[11] Patent Number: 5,222,128
[45] Date of Patent: Jun. 22, 1993

[54] TELECOMMUNICATION DISASTER PLAN

[75] Inventors: Garry R. Daly, North Aurora; William E. Hagerman, Naperville, both of Ill.; Sankara R. Polepalle, Holmdel; Earle H. West, Morganville, both of N.J.

[73] Assignee: AT&T Bell Laboratories, Murray Hill, N.J.

[21] Appl. No.: 558,286

[22] Filed: Jul. 26, 1990

[51] Int. Cl.$^5$ .......................... H04M 7/00; H04M 7/14
[52] U.S. Cl. ..................................... 379/221; 379/210; 379/279
[58] Field of Search ............... 379/210, 211, 212, 213, 379/220, 221, 279, 33

[56] References Cited

U.S. PATENT DOCUMENTS

| 3,560,663 | 2/1971 | Lee | 379/221 |
| 4,400,587 | 8/1983 | Taylor et al. | 379/221 |
| 4,800,583 | 1/1989 | Theis | 379/211 |
| 5,027,384 | 6/1991 | Morganstein | 379/211 |

OTHER PUBLICATIONS

Inbound/Outbound Magazine, article entitled "Disater Prevention" by Mike Bush, Nov. 1989, p. 54.
Advance Printing of 5ESS® Switch Recent Change Procedures, Batch Release 5E6 Software Release, AT&T 235-118-221, Issue 1.00, Sep. 1990.

Primary Examiner—James L. Dwyer
Assistant Examiner—Ahmad F. Matar
Attorney, Agent, or Firm—Werner Ulrich

[57] ABSTRACT

In case of a disaster at one of a plurality of customer's locations, it is desirable to provide for a massive rerouting of telephone calls to that customer. A SafetyNet Service Reconfiguration (SSR) tool enables a network service provider to provide a recovery service for the event where a customer's business location becomes "non-functional". By using the SSR tool, the telephone network service provider can preplan how to reroute a customer's incoming calls to alternate business locations, or to the employees' homes. The preplanning includes storing the local central office recent change (RC) messages necessary to implement an SSR plan, in RC text files and in executable data files. The RC text files can be easily maintained, and new RC executable files generated, as the customer's recovery needs change. To invoke an SSR plan, the network service provider starts execution of the designated RC executable file, via a single SSR tool command. When the SSR plan is invoked, the data from the RC executable file is activated, thereby rerouting the traffic.

2 Claims, 10 Drawing Sheets

FIG. 3

SAFETYNET
SERVICE RECONFIGURATION

ADMINISTRATION MENU

1. CREATE A NEW PLAN
2. UPDATE AN EXISTING PLAN
3. REMOVE AN EXISTING PLAN
4. CHANGE A PLAN NAME
5. RUN ERROR CHECKS AND MAKE PLAN EXECUTABLE
6. INVOKE A PLAN NOW
7. EXIT OR QUIT [<]

PLEASE ENTER YOUR SELECTION [1-7]

FIG. 4

SAFETYNET
SERVICE RECONFIGURATION

MESSAGE DISPLAY
:::: PLAN NAME ::::

FIG. 7

```
701 — MODE=EMI,DEMAND,CLERK=PLAN NAME!
702 — FORM=1V8&CHG!
703 — TN=2200900!
704 — LNEW="f1.f"&"/cfv"!
705 — LNEW="f1.a"&"n"!
706 — SET=cfvfwdn&"2200001"!
707 — CHG!
708 — ABORTFORM!
709 — FORM=1V8&CHG!
710 — TN=2200000!
711 — LCHG="f1.f"&"/cfv"-"f1.a"&"y"!
712 — CHG!
713 — ABORTFORM!
714 — FORM=1V8&CHG!
715 — TN="9790001"!
716 — LNEW="f1.f"&"/cfr"!
717 — SET=cfvfwdn&"9790001"!
718 — CHG!
719 — ABORTFORM!
720 — END:
```

FIG. 8

```
              SAFETYNET
       SERVICE RECONFIGURATION

NOTE: YOUR PLAN HAS BEEN SUCCESSFULLY EDITED.

YOU MUST "RUN ERROR CHECKS AND
      MAKE PLAN EXECUTABLE".

WOULD YOU LIKE TO DO SO NOW [Y=1,N=2]?
```

TELECOMMUNICATION DISASTER PLAN

TECHNICAL FIELD

This invention relates to a method and apparatus for implementing a massive rerouting of incoming calls to a telecommunications customer.

PROBLEM

A significant event requiring bulk rearrangement of telephone routing, such as a telephone customer telecommunications disaster, may require immediate changes to network switching system routing patterns, line features and/or announcements to meet the needs of the telephone company customer, especially if the customer has high priority needs. A problem with the prior methods of handling massive rerouting arrangements for rerouting all calls to a private branch exchange (PBX), such as disaster arrangements, is that telephone company personnel make these changes manually at the time of the disaster. While arrangements exist for preplanning and storing the alternate routing patterns needed to cope with such disasters, these arrangements are so difficult to use that, in practice, they are not used. Thus, for example, even though there had been many long range warnings of a possible earthquake, when the 1989 California earthquake struck, changes had to be entered manually after the disaster. Thus, a transition to a disaster plan state is generally not rapid and results in a significant delay or interruption in telephone customer service because telephone company personnel must enter too many changes, some of which may occasionally or inadvertently be entered incorrectly during a disaster.

Another problem with prior art disaster handling methods is that telephone office personnel also manually reconfigure the telephone office to its pre-disaster state after the disaster is over. This often leads to excessive delays in restoring customer services.

SOLUTION

The problems of the prior art are solved and an advance is made in the art by the present invention which provides a method and apparatus for permitting telephone craftspeople to enter and store data for automatically implementing a rerouting plan. In an exemplary embodiment of the invention, rerouting data is entered by the telephone craftspeople, and automatically checked before being stored in a telephone switching system and activated by telephone office personnel when a disaster occurs. Advantageously, a rerouting plan is activated efficiently with minimal customer service interruptions.

The exemplary embodiment of the present invention uses a SafetyNet Service Reconfiguration (SSR) tool. The tool is used on the 5ESS ® switch, manufactured by AT&T and described, for example, in *AT&T Technical Journal*, V.64, No. 6, Part 2, pp. 1303-1564, July/August 1985. The SSR tool allows telephone office personnel to create a telecommunications rerouting or disaster plan in the form of scripts in preparation for a disaster. The scripts are stored in response to a series of menu prompts each of which, when activated, cause a series of commands to be executed. The tool stores scripts and activates them responsive to receipt of a typed-in command from office personnel upon report of a disaster, whereupon the scripts reconfigure the 5ESS switch to a disaster mode. The scripts then restore the switch to its pre-disaster state responsive to receipt of a second command. A disaster is a typical condition for a preferred application of the invention; the invention can also be used for other conditions such as a seasonal change of traffic for a hotel. The transition from normal state to disaster state and back to normal state is made automatically in response to commands, ensuring proper disaster plan implementation and a minimum delay in restoring the switch to its pre-disaster state.

The SafetyNet Service Reconfiguration (SSR) tool enables the network service provider to provide a recovery service for the event where a customer's business location becomes "non-functional" (e.g., non-functional due to a premises disaster, snow day, etc.). The service includes preplanning the reroute of the business customer's incoming calls, updating that plan when necessary, and executing that plan (reroute) when necessary. The call reroute can be to one or many alternate branch locations for that business, or to the employees' homes, none of which need to be terminated on the same 5ESS switch serving the business location that is "non-functional". However, it is required that the 5ESS switch serving the "non-functional" site remain completely operational, including any required remote switching modules.

By using the SSR tool, the network service provider can create the reroute plan (called the SSR plan) for that business prior to the time the reroute is required. Multiple SSR plans can exist for each business customer. After an SSR plan is created, the SSR tool enables easy updating of the plan as the customer's recovery needs change. To invoke an SSR plan, the business customer notifies the network service provider, who then invokes the desired SSR plan via a single SSR tool command.

The SSR tool, and the customer's SSR plan, reside on the the 5ESS switch serving the customer location requiring the reroute. The SSR tool causes a menu of requests to be displayed, and, in response to a selection of one of the requests, causes the execution on the 5ESS switch of a UNIX ® user process. The SSR plan creates a file of the Recent Change (RC) messages necessary to perform the call reroute for the customer. When executed, these RC messages create an executable file for modifying the 5ESS switch Office Dependent Data (ODD) that is used for routing calls. An undo file is maintained to restore the pre-activation state.

The rerouting plan can be to reroute incoming calls to a proper subset (less than all) of the original destinations or to a proper superset (more than all) of the original destinations. This can be used for handling, for example, seasonal traffic.

BRIEF DESCRIPTION OF THE DRAWING

FIGS. 3-4, 8 and 13 are diagrams of SSR menu screens.

FIG. 7 is a diagram of a recent change (RC) text file.

DETAILED DESCRIPTION

Figure 1:
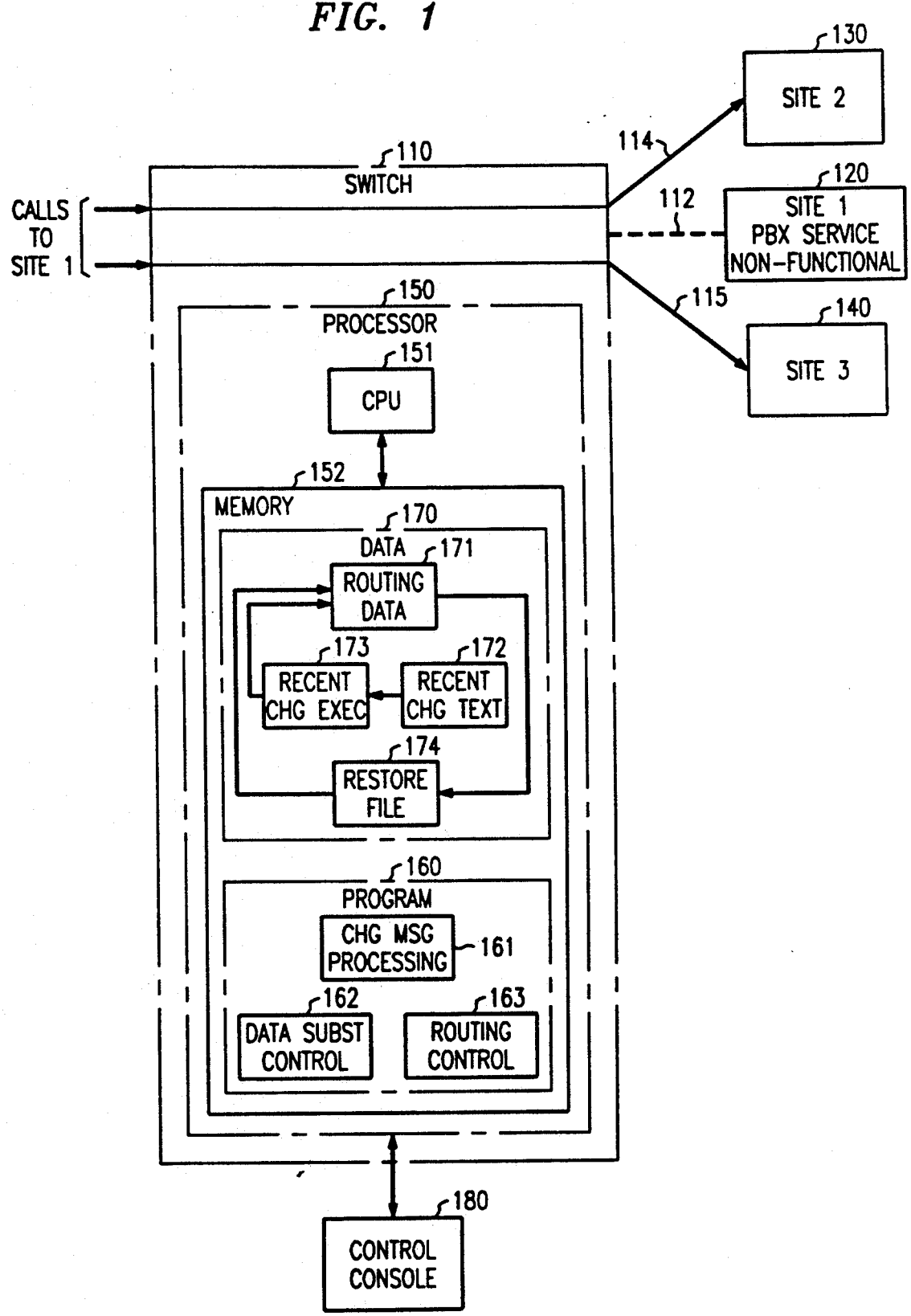
FIG. 1 is a block diagram illustrating a typical situation in which the SafetyNet Service Reconfiguration (SSR) tool would be used.

FIG. 1 is a diagram illustrating a typical situation in which the SafetyNet Service Reconfiguration (SSR) tool would be used. Site 1, a PBX service 120 "goes down" and becomes non-functional. The switching system 110 serving Site 1 120 must reroute incoming calls to Site 1 120 to Site 2 130 and Site 3 140. One or both of Site 2 130 and Site 3 140 may be served by a different switch. The SSR tool enables the network service provider to create, maintain, and invoke a business's SSR plan. To create an SSR plan, the SSR tool user must first determine the call rerouting needs of that business. Using the SSR tool, the user then enters, into an RC text file, the RC text messages necessary to reroute that business's incoming calls.

FIG. 1 shows that the switch has a control processor 150 comprising a central processing unit 151 and memory 152. The memory 152 may comprise random access memory plus a disk (not shown) for storing some of the data. The memory contains data sections 170 and program 160. Included in the program section 160 is a change message processing program 161 for processing change messages entered from a control console such as console 180, a routing data substitution control program 162 and a routing control program 163 for routing calls. Data 170 includes data block 171, the routing data for routing incoming calls, recent change (RC) text file 172 for accumulating the messages received from control console 180 for building up the data to allow calls to be rerouted, recent change (RC) executable file 173 to store the data that is to be substituted into routing data block 171 when the rerouting is invoked, and restore file 174 for storing data from routing data block 171 when rerouting is invoked so that the data may be subsequently restored after the rerouting is terminated.

The RC text file is an ASCII file comprising RC commands. Since the RC text file is not in machine usable form, the user instructs the SSR tool to generate an RC executable file from the RC text file. This RC executable file is a binary file. During the generation of the RC executable file, level 1 and level 2 error checks are performed on the RC messages to verify correctness. Level 1 error checks are domain checks which verify that attributes referenced in an RC file are within an acceptable, specified range. Level 2 error checks are form checks that verify that the correct fields are referenced in the RC file. For example, if field A is referenced in an RC file, and if fields A and B must always be referenced together in an RC file, a level 2 error check will verify that field B is also referenced.

By defining these RC executable files prior to the time when a business requires a call reroute, time is saved once the reroute is required. However, the tool user must periodically maintain and update these SSR plans as rerouting needs change. The purpose of the RC text files is to allow easy maintenance of SSR plans. Although the RC executable files can not be edited, the RC text files can. By using the SSR tool, the user specifies the RC text file to be edited, modifies that file where necessary, and generates a new RC executable file.

Once a business location requests its incoming calls be rerouted, the tool user invokes that business's SSR plan. This invocation, a single SSR tool command entered either at the serving 5ESS switch or remotely (e.g., a Switching Control Center), starts execution of the designated RC executable file.

After the business no longer requires its incoming calls to be rerouted, the appropriate RC executable file (the "undo" file of the SSR plan) can be invoked by the tool user to restore the original routing plan for that business.

Throughout the remainder of this description, the term "SSR plan" may refer to either the RC text file or the RC executable file, depending on the context. The SSR tool gives both files the same name (in different 5ESS switch file directories), which is referred to as the "Plan Name".

Methods of Call Rerouting

The following sections discuss three techniques for rerouting calls destined to a customer served by a 5ESS switch. Each of these techniques require changes to the ODD of the 5ESS switch performing the call reroute.

Call Forwarding

One method of rerouting calls, unconditional call forwarding, forwards calls for a Directory Number (DN) to another pre-specified DN. This line feature can forward to any DN in the network. One of the following call forwarding features can exist on each line: Call Forwarding Variable (CFV), Call Forwarding—Incoming Only (CFIO), Call Forwarding Within Group Only (CFIAG), Call Forwarding Over Private Facilities (CFPF), and Remote Call Forwarding (CFR), and Emergency Call Forwarding (ECF). (For a discussion of these features, except ECF, see 5ESS Switch Feature Handbook, AT&T, 1988.) Assignment of one of these features to a line is performed by the network service provider.

Any of these features may already be in use by the business customer requesting the SSR service. Since none of these call forwarding features can coexist with each other on the same line, the network service provider must determine which if any of these features that business customer is currently using. Conversely, these call forwarding features can coexist (in assignment) on the same line with the Call Forwarding—Busy Line (CFBL) and Call Forwarding—Don't Answer (CFDA) features.

The CFR feature is assigned and activated by the execution of an RC message in the SSR plan. The other call forwarding features are assigned inactive, and can be activated by the network service provider or the end user. The time it takes to invoke a business customer's SSR plan, is a function of the number of RC messages in the SSR plan. It is also a function of the type of RC messages, the call load on the 5ESS switch, and the control program of the 5ESS switch. The advantage of the CFR feature is that it only requires one RC command per line to assign and activate call forwarding. The other call forwarding features require two RC commands per line. If call forwarding is assigned on the lines at all times, then when the SSR plan is invoked, just one RC command per line is required to activate call forwarding.

Since call forwarding is a line feature, it can be used by all 5ESS switch customers served by lines. This includes Private Branch Exchanges (PBXs) that are served by the 5ESS switch via lines (loop-start or ground-start). In this case, the 5ESS switch lines serving the PBX are typically either in a Multi-Line Hunt Group (MLHG), or served by an attendant at the PBX who directs the incoming calls to the appropriate PBX user.

Emergency Call Forwarding (ECF) allows all calls to a group of lines to be forwarded to either a common or an individual directory number. A disaster plan can specify ECF activation as all or part of the disaster procedure. The group of lines each has the ECF feature as part of its normal translation data. Invoking the disaster plan then activates the ECF feature which overrides other call forwarding features of the line. In entering a disaster plan, the ECF invocation is specified by a single RC message for the entire group, the message including an identification of the group.

Change Route Index and Delete and Prefix Digits

This section discusses how to reroute incoming calls for customers who are served by trunks off the 5ESS switch (i.e., Direct Inward Dialing (DID) trunks to a PBX). This can be achieved by changing the primary Route Index (RI), in conjunction with digit deletion and prefixing.

Assume here that a PBX has a dedicated NXX, where NXX is the middle group of digits of an NPA-NXX-xxxx directory number, and is served by a 5ESS switch via DID trunks. Also assume that for each incoming call to this PBX, the NXX is enough to identify the primary RI for routing the call. Hence, to determine the RI, the 5ESS switch only performs digit analysis on the NXX of the called DN. The RI in turn identifies the Trunk Group (TG) over which the call is to be routed.

Consider the problem of creating an SSR plan that reroutes calls to DNs on this PBX, on an individual basis (i.e., incoming calls to each PBX DN can be rerouted to any pre-specified DN). This is achieved by inserting in the SSR plan, RC commands that expand the Local Digit Interpreter Table (LDIT) to allow digit analysis on the entire called DN, rather than just the NXX. For each DN analyzed in LDIT, the 5ESS switch identifies a RI. This RI in turn identifies the TG to which the call is to be sent.

RC messages are inserted in the SSR plan to define any new RIs required by the call reroute. Each RI specifies the number of dialed digits to delete, and which digits should be substituted (prefixed). For each RI in this example, all digits of the called DN are deleted, and an entirely different DN is substituted (prefixed). The prefixed DN is then transmitted over the TG specified by the new RI. Each DN being individually rerouted to a unique DN, requires a unique RI.

Digit analysis, and digit deletion and prefixing is used on any number of digits of the called DN (e.g., on the NXX, or down to the thousands digit, hundreds digit, tens digit, or the entire DN). For example, calls to a PBX can be rerouted by just changing the NXX of the called DN. Lets assume in this example, digit analysis is only required on the NXX in order to identify the RI for calls to this PBX. The reroute is accomplished by changing (via RC) the primary RI (for this NXX) to the RI of the new route. For the resulting RI, the called NXX digits are deleted, and a new NXX is prefixed. Of course, this requires that the digits that were not deleted be common between the original and new destination of the call (For a discussion of routing indexes, digit deletion and addition, see Ulrich et. al., Translations in the No. 1 Electronic Switching System, *Bell System Telephone Journal*, Sept. 1964).

In another example, all calls for a given NXX can be rerouted to a specific DN (a Multi-Line Hunt Group). This is achieved by performing digit analysis on just the NXX (of the called DN) to identify the calls to be rerouted. The resulting RI then has all digits of the called DN deleted, and a new DN prefixed. This example shows that the number of digits analyzed by digit analysis is independent of the number of digits deleted and prefixed.

If the NXX of a called DN uniquely identifies an RI, then LDIT must be populated (with database tuples) for that NXX. If each DN for a given NXX requires a unique RI (as in this example), then LDIT needs to be populated for each DN. Since the latter case requires more digits of a DN to be analyzed, it requires more database tuples in LDIT.

To save time once a customer requires call rerouting, portions of the above mentioned procedures can be implemented prior to the time the reroute is required. For instance, an end user's rerouting needs may require LDIT to be further populated, and new RIs to be defined. Both of these requirements can be implemented in the 5ESS switch prior to the time of the reroute. Calls to that end user are not rerouted if all of the RIs point to the same TG, and no digit deletion and prefixing is performed. Once the reroute is required, then the RIs can be individually changed (via RC) to point to the appropriate TGs, and to delete and prefix the digits. Change the Normalized Office Code Calls to a business with a unique NXX, can be rerouted within the same 5ESS switch, by using RC to change the Normalized Office Code (NOC) of the original NXX. However, the "new" destination of the incoming call reroute must be on the same 5ESS switch as the "old" destination. The new NOC points to a different NXX served by the same 5ESS switch.

SSR Tool Usage

Figure 2:
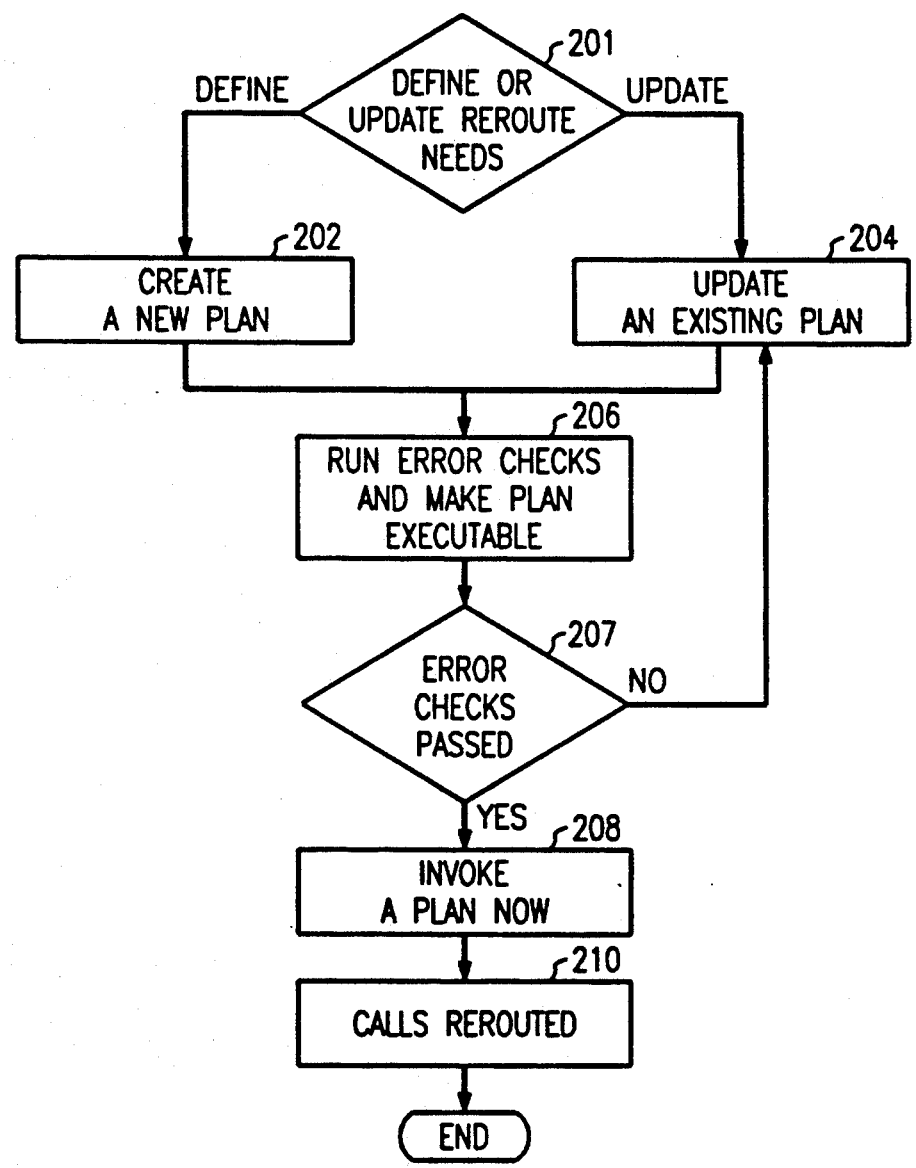
FIGS. 2, 5-6, 9-12 and 14 are flow diagrams of SSR functions.

FIG. 2 is a flow diagram illustrating the use of the SSR tool. A user of the tool must first decide whether they are defining a new reconfiguration plan or updating an existing plan (test 201). If a new plan is needed, the tool allows the user to create a new plan (action block 202). If an existing plan is being updated, the tool allows the user to make changes to the existing plan (action block 204). Once a new plan has been created or an existing plan has been updated, the SSR tool runs error checks on the plan and makes it executable (action block 206). The tool next checks whether the error checks were passed (test 207). If the tests were passed, the tool invokes the plan, reconfiguring the switching system (action block 208) and the switching system reroutes calls according to the plan (action block 210). If the tests were not passed, the plan must be updated to correct any errors (action block 204). In order to provide good response to the craftsperson entering data, the SSR tool programs run at an elevated priority compared to the base priority for other programs for responding to console inputs.

SSR Tool Location on 5ESS Switch

The SSR tool is located in the "/unixa" directory on the 5ESS switch. Also located in "/unixa" will be the RC text files, and an error file called "errorfile," which contains the error check results of the most recent generation of an RC executable file. The RC executable files are automatically stored in the "/rclog" directory.

Invoking SSR Tool

The SSR tool may be invoked from any 5ESS switch RC or UNIX terminal via craft shell using the following commands:

>rcv:menu:sh
cd/unixa
ssr
SSR Menu Screens

The SSR tool is menu driven. Upon invoking the SSR tool, the user is given the Administration Menu shown in FIG. 3.

As shown in FIG. 4, the SSR tool inserts a message display on the view the user is currently using, to provide confirmation or error messages for the requested tool operation. These messages are listed below:

ERR CHECKS COMPLETE
INVALID NAME
INVALID SELECTION
PLAN ALREADY EXISTS
PLAN DELETED
PLAN INSERTED
PLAN NAME UPDATED
PLAN NOT FOUND

The "INVALID SELECTION" message is printed when an invalid menu item is selected. The other messages are discussed in detail throughout this description.

Create a New Plan

Figure 5:
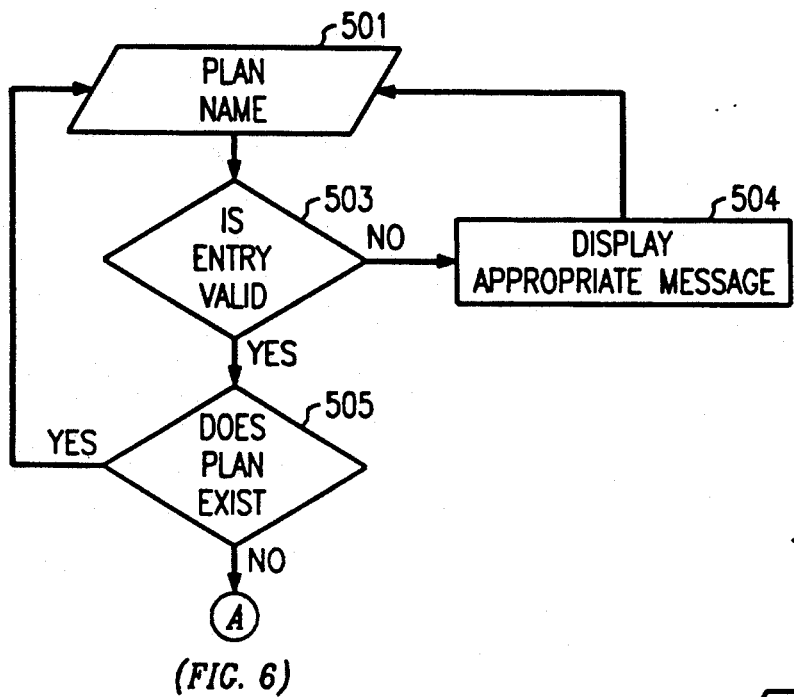

FIG. 5 is a flow diagram of Menu item 1, "Create a New Plan", which allows the user to create an RC text file. It first asks the user to specify the Plan Name for the newly created file (block 501). The Plan Name must be no more than 10 characters in length, and can consist of only capital letters "A-Z" and digits "0-9." The tool next checks whether a valid name has been entered (test 503). If the user enters invalid characters or more than 10 characters, the tool responds "INVALID NAME" (action block 504). The tool next checks whether the entered plan name is for an existing plan (test 505). If the user enters a Plan Name for which an RC text file or RC executable file already exists, the tool responds "PLAN ALREADY EXISTS." In either case, the user is prompted for another Plan Name (block 501).

Figure 6:
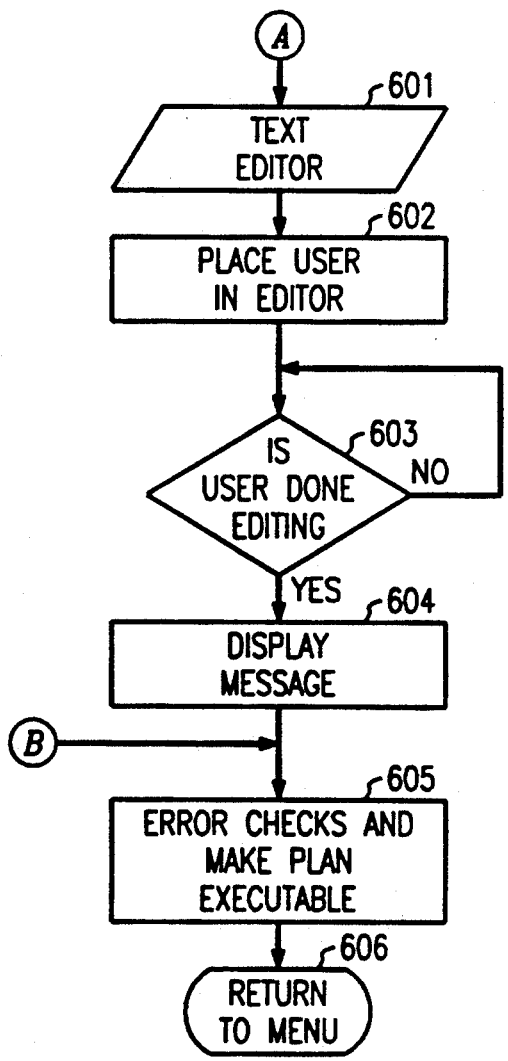

FIG. 6 is a flow diagram of what happens after a valid plan name has been entered. When a valid Plan Name has been entered, the user is prompted to choose a text editor (block 601). Once a valid choice is entered, the user is placed in that editor, with a line of RC text inserted as the first (and only) line in that RC text file (action block 602). This first line of text contains the Plan Name, and defines the RC mode. This line should not be altered in any way. At this point, the tool user must define and enter into the RC text file, all appropriate RC messages. Note, every line of text must end with an "!" except for the last line. The last line of text must be "END;". A sample RC text file, which assigns and activates Call Forwarding Variable (CFV) and Remote Call Forwarding (CFR) for two different DNs, is shown in FIG. 7 and described below.

(701): MODE=BMI,DEMAND,CLERK=PLAN NAME!—This line indicates that the Batch Mode Input (BMI) demand mode of APPTEXT recent change is being used. APPTEXT recent change is a type of recent change in which commands are typed into an RC text file versus other types which are menu driven. The "PLAN NAME" is the actual name the SSR user gave this text file.

(702): FORM=1V8&CHG!—This line indicates that recent change form 1.8 is being accessed.

(703): TN=2200000!—This line indicates that the recent change view associated with Terminal Number 2200000 is being accessed.

(704): LNEW="fl.f"&"/cfv"!—This line indicates that the feature "call forwarding variable" is being assigned to this TN.

(705): LNEW="fl.a"&"n"!—This ensures/cfv is not active on this TN. Note that RC does not allow the RC message that assigns /cfv, to also activate /cfv.

(706): SET=cfvfwdn&"2200001"!—This indicates that once /cfv is active, the calls should be forwarded to 2200001.

(707): CHG!—This denotes the end of the RC message.

(708): ABORTFORM!—This line is used to prevent any unnecessary processing of a recent change form (message) if it had any level 1 or level 2 errors.

(709): FORM=1V8&CHG!—same as above.

(710): TN=2200000!—same as above.

(711): LCHG="fl.f"&"/cfv"—"fl.a"&"y"!—This activates call forwarding for TN 2200000.

(712): CHG!—same as above.

(713): ABORTFORM!—same as above.

(714): FORM=1V8&CHG!—same as above.

(715): TN=9790000!—This indicates that the view for TN 9790000 is being accessed.

(716): LNEW="fl.f"&"/cfr"!—This assigns and activates remote call forwarding.

(717): SET=cfrfwdn&"9790001"!—This sets the "forward to" DN to 9790001.

(718): CHG!—same as above.

(719): ABORTFORM!—same as above.

(720): END;—This ends the APPTEXT BMI session.

The "ABORTFORM!" line must be placed immediately after each "CHG!" line. Its use is explained in the "Run Error Checks and Make Plan Executable" section.

The tool waits until the user exits the editor, indicating the editing is complete (test 603). When the user exits the editor, the tool displays the message shown in FIG. 8 (action block 604), and prompts the user to "Run Error Checks and Make Plan Executable" (action block 605). The message "ERR CHECKS COMPLETE" followed by the Plan Name will print if the user chose to "Run Error Checks and Make Plan Executable". The tool then returns to the Administration Menu 9 (action block 606).

Update an Existing Plan

Figure 9:
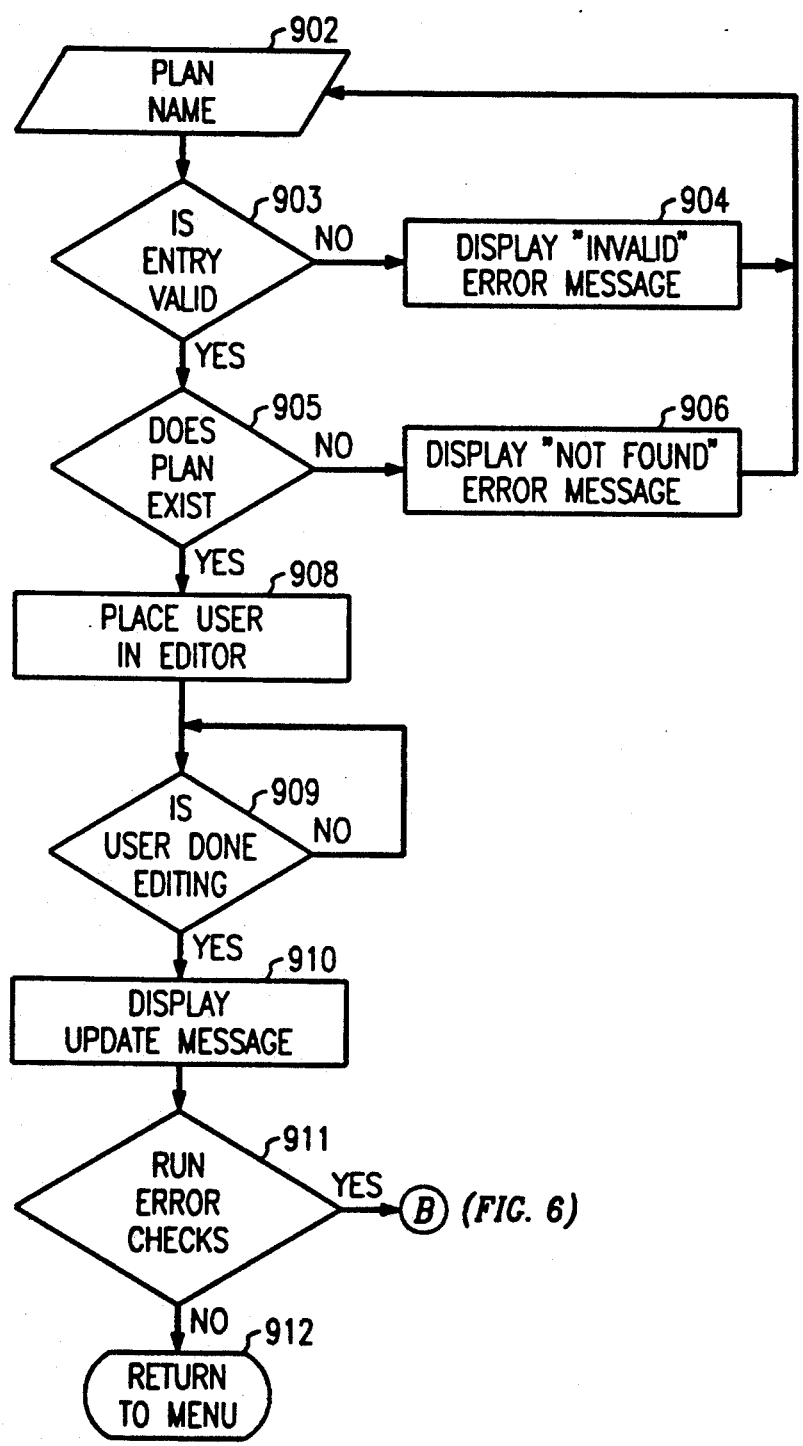

FIG. 9 is a flow diagram of Menu item 2, "Update an Existing Plan." The tool first prompts the user for the Plan Name corresponding to the RC text file to be updated (action block 902). The tool next checks whether the entered name is valid (test 903). If not valid, an error message is displayed, and the user is prompted for another name (action block 902). If the plan name is valid a search is made for the corresponding RC text file (test 905). If an RC text file does not exist for the given Plan Name, the tool responds "PLAN NOT FOUND" (action block 906) and prompts the user for another Plan Name (action block 902). If the SSR plan is found, the user is placed in an editor of choice to update the RC text file (action block 908). The corresponding RC executable file, if it exists, is removed at this point. Removal of the RC executable file whenever the RC text file is updated, prevents the "old" RC executable file from being executed. It forces the tool user to generate a new RC executable file.

The tool waits for the user to exit the editor (test 909). When the user exits the editor, the tool displays the message "PLAN NAME UPDATED" followed by the Plan Name (action block 910), and gives the user the option to "Run Error Checks and Make Plan Executable" (test 911). If the user choses to run the error checks, they are then run (refer to FIG. 6), otherwise, the tool then returns to the Administration Menu (action block 912).

Remove an Existing Plan

Figure 10:
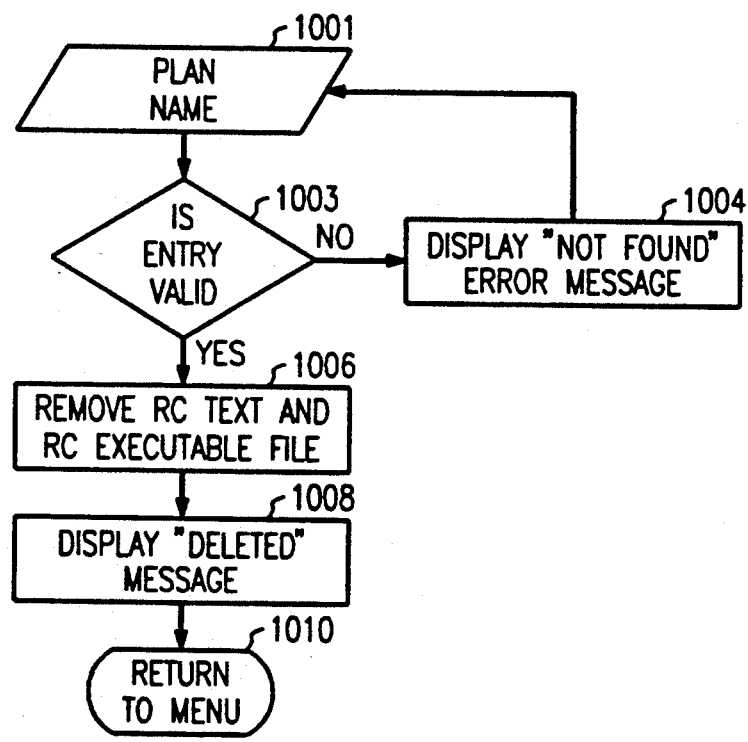

FIG. 10 is a flow diagram of Menu item 3, "Remove an Existing Plan", which first prompts the user for the Plan Name to be removed. The tool next checks whether the entered name is valid and already exists (test 1003). Both the RC text file and the RC executable file are removed, if they exist. If neither file exists for the given Plan Name, the tool responds, "PLAN NOT FOUND," (action block 1004) and prompts the user for another Plan Name (action block 1002). If the files are found, the tool removes both the RC text file and the RC executable file (action block 1006). Once finished, the tool displays the message "PLAN DELETED" along with the Plan Name (action block 1008), and returns to the Administration Menu (action block 1010).

Change a Plan Name

Figure 11:
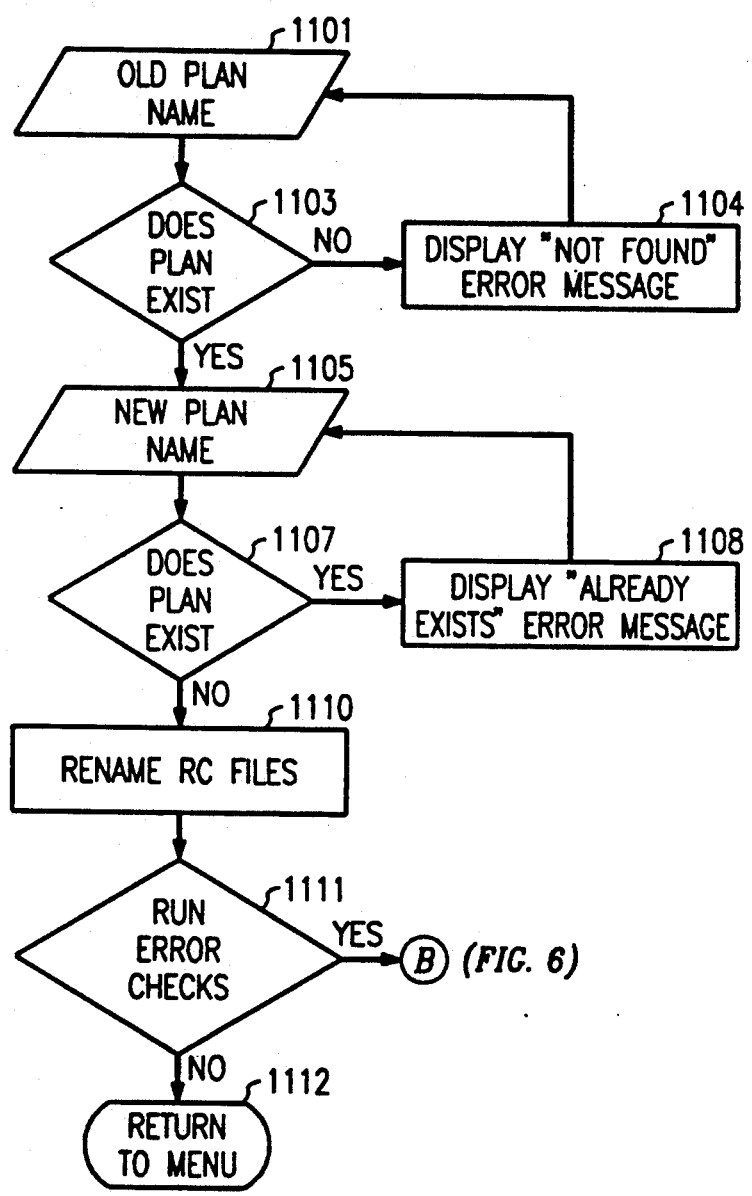

Menu item 4, "Change a Plan Name", allows the user to rename an SSR plan. FIG. 11 is a flow diagram of "Change a Plan Name." The user is first prompted for the old Plan Name (block 1101). If the corresponding plan does not exist (test 1103), the tool responds "PLAN NOT FOUND" (action block 1104) and prompts the user for another old Plan Name (block 1101). If it does exist, the user is prompted for a new Plan Name (action block 1105). The "New Plan Name" prompt is printed on the terminal screen after the user has entered a valid old Plan Name. If an RC text file or RC executable file exists under the new Plan Name (test 1107), the tool responds, "PLAN ALREADY EXISTS." Otherwise, the tool renames the RC text file (action block 1110), removes the RC executable file since it contains the old Plan Name, and gives the user the option to "Run Error Checks and Make Plan Executable" (test 1111). The message "ERR CHECKS COMPLETE" followed by the Plan Name will print if the user chose to "Run Error Checks and Make Plan Executable". If the user choses to run the error checks, they are then run (refer to FIG. 6), otherwise, the tool then returns to the Administration Menu (action block 1112).

Run Error Checks and Make Plan Executable

Figure 12:
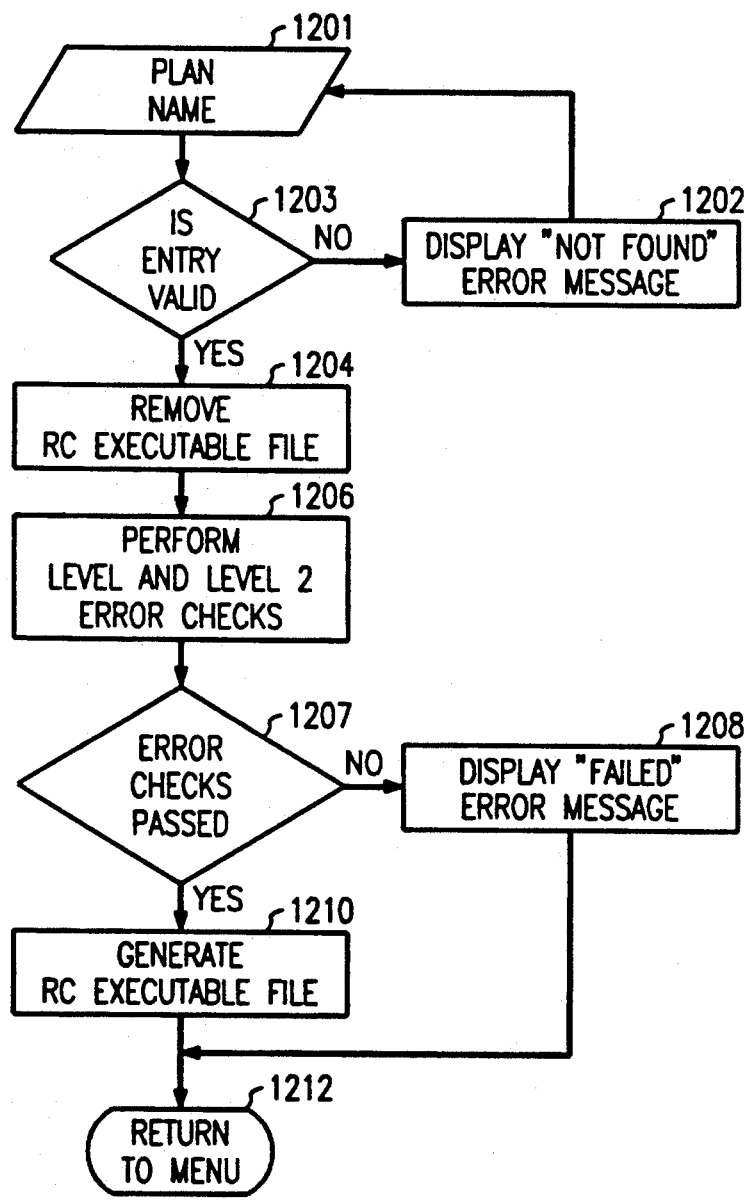

FIG. 12 is a flow diagram of Menu item 5, "Run Error Checks and Make Plan Executable", which generates an RC executable file from the specified RC text file. This procedure must be performed, at some point in time, after every time an RC text file is edited in any way (i.e. Plan Creation, Plan Update, or Change a Plan Name). This procedure should also be performed periodically on each RC text file, to error check each RC text file against the current 5ESS switch Office Dependent Data (ODD).

The tool first prompts the user for the Plan Name (action block 1201). If the RC text file for the given Plan Name does not exist (test 1203), the tool responds "PLAN NOT FOUND" (action block 1202) and prompts the user for another Plan Name (action block 1201).

If the Plan Name entered is valid, the current RC executable file by that name, if it exists, is removed (action block 1204). Level 1 and level 2 error checks are then performed on the RC text file (action block 1206). Error messages are written to both the terminal screen, and a file called "errorfile." The file "errorfile," which exists in the "/unixa" directory, stores the error check output from the most recent "Run Error Checks and Make Plan Executable" invocation. The error file should contain an "OK" line corresponding to each RC command in the RC text file that passed error checks, and an error summary line (starting with "?E") for each RC command that failed error checks. The exception is that each "ABORTFORM" in the RC text file, results in the "OK—No Form To Abort" line in the error file if the RC message had no errors, and an "OK" line if the RC message had an error. The "OK" prints when there is a "form to abort", which means that RC message had an error. The one-to-one line number correspondence between the RC text file and the error file, allows for identification of which RC command is in error.

The "ABORTFORM!" line in the RC text file is used to eliminate unnecessary processing of a FORM when the first level 1 or level 2 error has been detected. All other error messages are suspended and error processing continues with the next FORM.

If error checks pass (test 1207), a new RC executable file is generated with the same name as the RC text file (action block 1210), and is stored in the "/rclog" directory. If error checks fail, an error message is displayed (action block 1208). The RC text file must be corrected and error checks rerun. Unless the error checks pass, no RC executable file is generated, hence, leaving no SSR plan to invoke. Finally the tool returns to the Administrative Menu (action block 1212).

More descriptive error messages will be printed in the error file if "MSG!" text lines are included between every line of RC text. Each "MSG!" line returns one descriptive error message, or if there was no error, it returns: "OK—No Error or Warning Message". Since recent change can return multiple error messages per RC command in error, it is recommended to use multiple (e.g., three) "MSG!" lines between each line of RC text.

To save on labor and file size, the "MSG!" lines should only be entered in the RC text file after it has been determined that an RC command failed error checks, and debugging becomes difficult. Insert the "MSG!" lines only where needed.

Invoke a Plan Now

Menu item 6, "Invoke a Plan Now", prompts the user for the Plan Name corresponding to the RC executable file to be invoked). If an RC executable file does not exist for the Plan Name entered, the tool responds "PLAN NOT FOUND", and prompts the user for another Plan Name. Otherwise, the tool starts execution of the RC executable file, and displays 5ESS switch output messages for all RC successes and failures. An RC executable file can also be invoked without the use of the SSR tool. Two methods are available:

(1) At the Master Control Console (MCC) of the 5ESS switch, type
   >EXC:RCRLS,CLERK=PLAN NAME;
(2) Use Batch Mode Release (BMR) in Recent Change Menu Mode.

Figure 13:
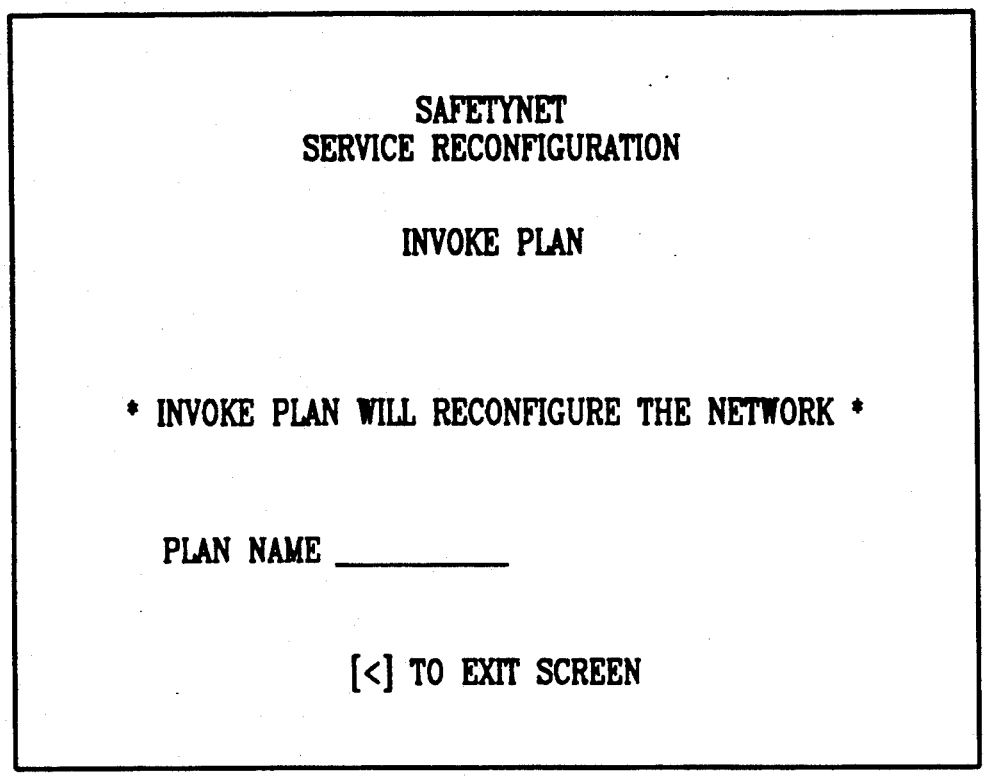

FIG. 13 is diagram illustrating "Invoke Plan" menu screen.

SSR tool enables the network service provider to provide a recovery service for the event where a customer's business location becomes "non-functional". By using the SSR tool, the network service provider can preplan how to reroute a customer's incoming calls to alternate business locations, or to the employees' homes.

The preplanning includes storing the 5ESS switch RC messages necessary to implement an SSR plan, in RC text and executable files. The RC text files can be easily maintained, and new RC executable files generated, as the customer's recovery needs change. Level 1 and level 2 error checks are performed on the RC test files to verify correctness. To invoke an SSR plan, the network service provider starts execution of the designated RC executable file, via a single SSR tool command.

Restoring the Switch To Its Original State

Figure 14:
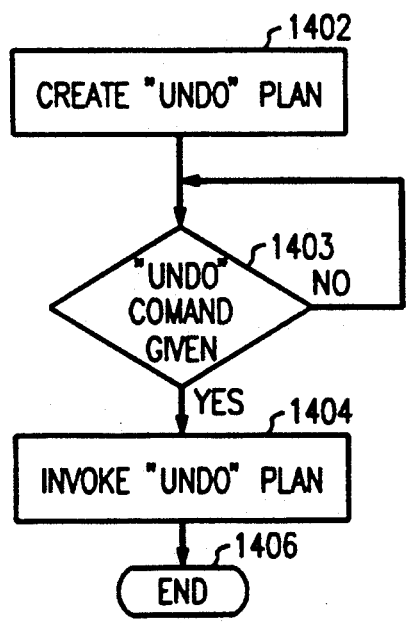

After the disaster or event prompting a reconfiguration of the switch is over, a customer may restore the switch to its pre-disaster state. FIG. 14 is a flow diagram illustrating the process of restoring the original switch configuration. When an SSR Reconfiguration Plan is created, an "UNDO" Plan should also be created (action block 1402) which will contain RC commands to "undo" the changes of the Reconfiguration Plan. The "UNDO" Plan can be created using the "Create A Plan" menu item described in FIGS. 5 and 6. The tool waits until a command is received to invoke the "UNDO" Plan (test 1403), which is invoked the same as any other plan, using the "Invoke A Plan" menu item (action block 1404). After the "UNDO" Plan has been invoked, the switch is restored to its pre-disaster state.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A telephone switching system comprising:
 a routing database for selectively storing first or second numbers for first or second destinations, respectively, said first numbers being normally stored in said database for routing incoming calls to the first destinations identified thereby;
 processor means, operative under the control of a first program and comprising file means for storing data files and responsive to messages receivable from a control console by said processor means, for producing and storing in said file means a message file of recent change messages comprising said second numbers for said second destinations;
 said processor means, operative under the control of a second program, for storing an executable file of data, said executable file produced from said message file for rerouting calls to second destinations identified thereby when said first destinations are designated nonfunctional; and
 said processor means, operative under the control of a third program, for bulk substituting said second numbers for said second destinations for said first numbers for said first destinations in said routing database in response to receiving an indication that said first destinations are becoming nonfunctional, by executing said executable file;
 wherein said processor means under the control of said first program is responsive to a request to execute programs at a priority level, and to display a menu at said control console, and responsive to a selection of an item on said menu, for executing a UNIX process for prompting for input data, for checking said input data and for binding input data for a disaster plan into a message file.

2. The switching system of claim 1 wherein said processor means is further operative under the control of said first program for creating a group text file entry for an invocation of emergency call forwarding for a specified group of lines responsive to a command from said control console; and
 wherein said processor means is further operative under the control of said second program, responsive to said group text file entry, for producing an executable file entry for invoking emergency call forwarding for said specified group.

* * * * *